July 4, 1967   H. B. GRAVES ETAL   3,329,380
TREE STAND

Filed May 24, 1965   2 Sheets-Sheet 1

INVENTORS
HARRIS B. GRAVES
MARILYN J. GRAVES
HERBERT EGERER
BY

INVENTORS
HARRIS B. GRAVES
MARILYN J. GRAVES
HERBERT EGERER 3,329,380
TREE STAND
Harris B. Graves and Marilyn J. Graves, both of 9968 W. Center Road, Omaha, Nebr. 68124, and Herbert Egerer, Omaha, Nebr.; said Egerer assignor to said Harris B. Graves and said Marilyn J. Graves
Filed May 24, 1965, Ser. No. 458,363
4 Claims. (Cl. 248—44)

This invention relates to a tree stand and more particularly to a Christmas tree stand.

Christmas trees have always presented a problem when the erector attempts to install one in a tree holder. The bottom limbs of the tree are located many times on the trunk in such manner as to obstruct the installation of the tree into the stand. It is therefore necessary to remove one or more limbs before the stand can be mounted, and in the process the esthetic view of the tree is often damaged. Thus, rather than the decorating of the tree being an enjoyable occasion, it becomes an onerous task. In other instances of mounting a tree in the conventional stand, the height of the tree is such that the top must be bent against the ceiling to set the base into the stand, or the tree must be placed in an awkward horizontal position to manhandle the stand onto the end thereof.

Furthermore, at the end of the Christmas season there is also the problem of storage of a cumbersome tree stand. To obviate these and other disadvantages of present day Christmas tree stands, the improved tree stand of this invention is provided.

Another object of this invention is to provide a tree stand which is simple to mount on the base of a tree.

Yet another object of this invention is to provide a Christmas tree stand which is easy to mount without removing the lower branches of the tree.

A further object of this invention is to provide a Christmas tree stand which when not in use can be readily disassembled for compact storage.

Still another object of this invention is the provision of a tree stand characterized herein, and capable of attaining the objects listed hereinbefore which is economical to manufacture, simple and rugged in construction, and effective in operation.

These objects and other features and advantages of this invention will become readily apparent upon reference to the following description when taken in conjunction with the accompanying drawings, wherein.

Figure 1:
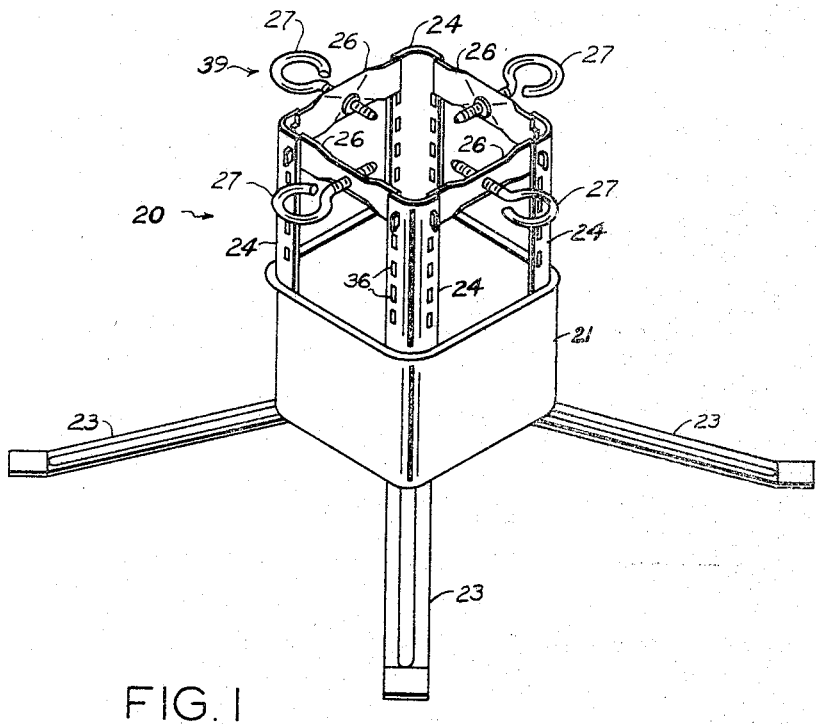
FIG. 1 is a perspective view of a preferred embodiment of the tree stand of this invention.
Figure 7:
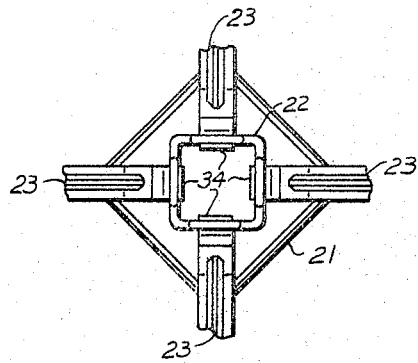
FIG. 7 is a fragmentary bottom plan view of the stand of FIG. 1.
Figure 8:
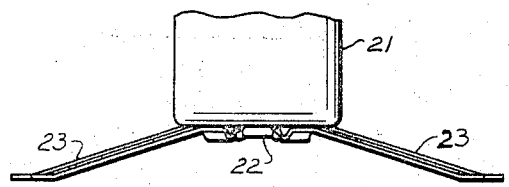
FIG. 8 is a fragmentary side elevational view of the floor supporting structure of the tree stand.

Referring now to the drawings, the tree stand of this invention is shown generally at 20 (FIG. 1) consisting basically of a container 21, a support retainer ring 22 (FIG. 7), a plurality of support members 23, upright members 24, detachable brackets 26, winged screws 27, and a base plate 30.

The container 21 (FIG. 1), rectangular in shape and open at the top thereof, is adapted to receive the base of the tree and is watertight.

Figure 6:
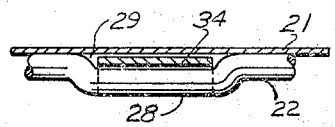
FIG. 6 is a fragmentary sectional view taken along the line 6—6 in FIG. 5.

To the bottom of the container 21 is mounted a support retainer ring 22 (FIG. 7) formed from an inflexible material. The retainer ring 22 is shaped in the form of a square where four support members 23 are used to support the container, however the retainer ring 22 could be shaped in other forms depending on the number of support members 23 desired. Each side of the ring 22 is formed to provide an offset 28 (FIG. 6) equal to approximately one half the length of each side. When the retainer ring 22 is fastened, as by welding, to the underside of the container 21, the offset 28 provides an elongated opening 29 (FIG. 6) between the bottom of the container 21 and the retainer ring 22.

Figure 2:
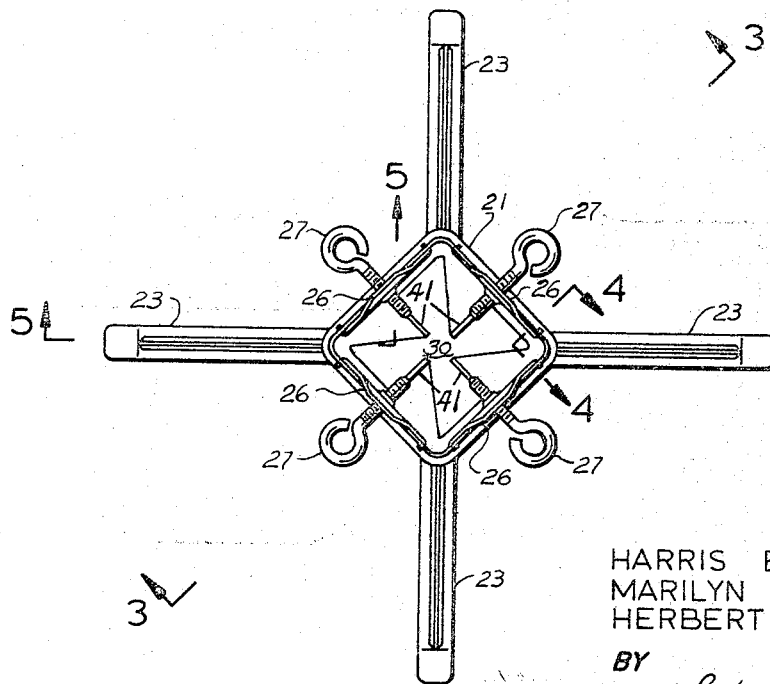
FIG. 2 is a top plan view of the structure.
Figure 5:
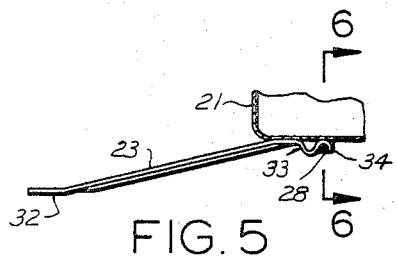
FIG. 5 is a fragmentary sectional view taken along the line 5—5 in FIG. 2.

A plurality of support members 23 (FIG. 2) are provided to support the container 21 in an upright position. Each support 23 is an elongated bar bent at one end to provide a bearing surface 32 (FIG. 5) which will not dig into the surface on which it stands. The opposite end 33 of each support 23 is bent with an S shape as best illustrated in FIG. 5, whereby the outer end 34 is adapted to be inserted through an opening 29 (FIG. 6), enabling the container 21 to rest on and be fixedly supported by the four supports 23.

Elongated upright angle members 24 (FIG. 1) are securely fastened to the container 21 and extend upwardly therefrom so as to extend above the top of the container. Each member 24 has a plurality of vertically spaced slots 36 formed therein. Common slots on any adjacent pair of members 24 are horizontally aligned.

Figure 3:
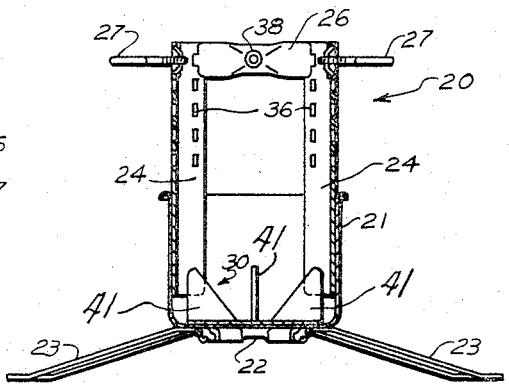
FIG. 3 is a cross-sectional view taken along the line 3—3 in FIG. 2.

The brackets 26 (FIG. 1), equal in number to the number of members 24, are detachably secured to and extended between each pair of adjacent members 24. Each bracket 26 has a pair of hooked lugs 37 (FIG. 4) integral therewith, one at each end of a bracket and extending at right angles thereto. The lugs 37 are retractably extended through a horizontally aligned pair of slots 36 in adjacent members 24 as best illustrated in FIG. 3. Through each bracket 26 is formed an opening 38, which in the particular embodiment of the invention illustrated is drilled and tapped. A tree engaging unit 39 (FIG. 1) in the form of the winged threaded screw 27 is reciprocally insertable through the opening 38 in each bracket 26. These units 39 are provided to adjustably coact with each other to position and hold the tree in an upright position relative to the brackets 26.

To center and securely hold the base of the tree, a base plate 30 (FIG. 3) is provided. The base plate 30 has a plurality of knifelike fins 41 integral therewith, triangular in shape, and projecting upwardly from the base of the container 21. The remainder of the base plate 30 is secured flat against the bottom of the container 21. By this arrangement of the fins 41, an inverted frustro-conical opening is formed within the container 21 for receiving, centering, and securely holding the base of a tree.

Figure 4:
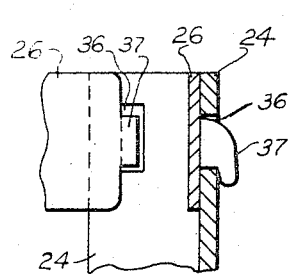
FIG. 4 is a fragmentary sectional view taken at line 4—4 in FIG. 2.

In mounting a tree in the tree stand 20, the brackets 26 are easily removed from the members 24 by merely pivoting each bracket 26 counterclockwise, for example, in place while raising it slightly (FIG. 4). The tree is then inserted into the container 20 with the base of the tree in contact with the projecting fins 41 of the base plate 30. The members 24, generally parallel to the trunk of the tree can be made to slide between the lower branches of the tree by rotating the tree where necessary. The brackets 26 are then re-assembled to the members 24 by replacing the lugs 37 in the horizontally aligned pairs of adjacent slots 36.

Importantly, should a lower branch of the tree be in the way of a bracket 26, the bracket can be re-assembled to the upright members 24 at a location vertically spaced from one or more of the other members 24. Thus, the removing of any lower branches is substantially obviated.

The reciprocally insertable tree engaging wing screws 39 are then screwed through their respective brackets until they engage the tree base thus holding it securely and causing the tree to stand perpendicular to the plane of the container top. The support members 23 or legs are then hooked into place on the retainer ring 22 and the tree and tree stand can then be placed in an upright position.

Although a preferred embodiment of this invention has been described and disclosed hereinbefore, it is to be remembered that various modifications and alternate constructions can be made thereto without departing from the true spirit and scope of the invention as defined in the appended claims.

We claim:

1. A stand for supporting a tree comprising in combination:
   container means open at the top thereof and adapted to receive the base of a tree;
   means secured to the bottom of said container means to support said container means in an upright position;
   a plurality of members each secured in an upright position to said container means, each member having a plurality of vertically spaced slots formed therein;
   a bracket adapted to be detachably secured to and extended between each pair of adjacent members, said bracket having a pair of hooked lugs formed thereon, which lugs are insertable through a pair of said slots whereby to suspend said bracket between said adjacent members; and
   means adjustably cooperable with each bracket and engageable with the tree base to hold it rigid relative to said container means.

2. A stand for supporting a tree comprising in combination:
   a watertight, rectangular container open at the top thereof and adapted to receive the base of a tree;
   retainer means secured to said container means;
   support means detachably secured to said retainer means;
   a plurality of upright members secured to said container means and extending upward therefrom, each member having a plurality of vertically spaced slots formed therein;
   a bracket detachably secured to and extended between each pair of adjacent upright members, said bracket having a pair of lugs integral therewith, said lugs retractably extendable through a pair of said slots in said adjacent upright members, said bracket having an opening formed therein; and
   a screw element reciprocally insertable through said opening for engagement with the base of the tree.

3. A stand for supporting a tree comprising in combination:
   a rectangular container open at the top thereof and adapted to receive the base of a tree;
   retainer means secured to the bottom of said container means;
   support means detachably secured to said retainer means to support said container means in an upright position;
   a plurality of upright members secured to said container means and extending upwardly therefrom, each member having a plurality of vertically spaced slots formed therein;
   a bracket detaching secured to and extended between each pair of adjacent upright members, said bracket having a pair of lugs integral therewith, said lugs retractably extendable through a horizontally aligned pair of said slots;
   base plate means mounted in the bottom of said container means, having a plurality of triangularly shaped knifelike fins projecting therefrom with the hypotenuse of said fins facing inwardly, forming an inverted frustro-conical opening within said container for centering and securely holding the tree base; and
   a tree engaging element reciprocally insertable through each bracket to hold and position the tree in an upright position.

4. A stand for supporting a tree comprising in combination:
   container means open at the top thereof;
   means secured to said container means to support said container means in an upright position;
   a plurality of upright members secured to said container means and extending upwardly therefrom;
   a plurality of substantially, flat right angular brackets, each of said brackets detachably secured at opposite ends thereof to and extended between each pair of adjacent upright members in any one of a plurality of vertically spaced positions; and
   means adjustably cooperable with each bracket and engageable with the tree to hold it rigid relative to said bracket means.

References Cited

UNITED STATES PATENTS

| 2,609,169 | 9/1952 | Kroeger | 248—48 |
| 2,891,747 | 6/1959 | Steede | 248—44 |
| 2,931,604 | 4/1960 | Weddle | 248—44 |

FOREIGN PATENTS 206,207  1/1940  Switzerland.

JOHN PETO, *Primary Examiner.*

CLAUDE A. LE ROY, *Examiner.*